United States Patent [19]
Klopfer et al.

[11] Patent Number: 5,228,844
[45] Date of Patent: Jul. 20, 1993

[54] ROTARY DISTRIBUTOR TYPE FUEL INJECTION PUMP

[75] Inventors: Kenneth H. Klopfer, East Hartland; Ilija Djordjevic, East Granby; Malcolm C. Higgins, Windsor Locks; Daniel E. Salzgeber, Windsor, all of Conn.

[73] Assignee: Stanadyne Automotive Corp., Windsor, Conn.

[21] Appl. No.: 960,967

[22] Filed: Oct. 14, 1992

[51] Int. Cl.⁵ .................... F04B 17/02; F02M 37/04
[52] U.S. Cl. .................... 417/440; 417/462; 123/506
[58] Field of Search ............... 417/462, 279, 278, 440; 123/501, 506

[56] References Cited

U.S. PATENT DOCUMENTS

| | | | |
|---|---|---|---|
| 4,492,200 | 1/1985 | Takahashi | 417/462 X |
| 4,896,645 | 1/1990 | Potter | 123/506 |
| 5,044,893 | 9/1991 | Collingborn | 417/440 X |
| 5,103,792 | 4/1992 | Winkler | 123/506 |

*Primary Examiner*—Richard E. Gluck
*Attorney, Agent, or Firm*—Chilton, Alix & Van Kirk

[57] ABSTRACT

A fuel injection pump having a rotor with a distributor rotor at its outer end and an annular arrangement of radial pumping plunger bores providing a pumping chamber at its inner end. The pump rotor has a coaxial throughbore providing a valve bore intersecting the annular arrangement of plunger bores. A poppet valve, axially shiftable in the valve bore, has a sealing head engageable with a valve seat at the inner end of the rotor throughbore. An armature of a valve electromagnet is fixed to the outer end of the poppet valve for attraction by a coaxial stator when the electromagnet is energized. The poppet valve and armature are coupled to the pump rotor for rotation therewith. A coaxial accumulator bore is provided in a drive shaft adjacent the inner end of the rotor throughbore for supplying fuel to and receiving spilled fuel from the pumping chamber. A shaft driven transfer pump supplies fuel via an annulus in the distributor head to a chamber at the outer end of the rotor and then via the rotor throughbore and a coaxial bore in the poppet valve to the accumulator bore. A pressure regulator is connected between the accumulator bore and transfer pump inlet.

27 Claims, 4 Drawing Sheets

ROTARY DISTRIBUTOR TYPE FUEL INJECTION PUMP

BACKGROUND AND SUMMARY OF THE INVENTION

The present invention relates to fuel injection pumps of the type having a pump body and distributor rotor in coaxial alignment, the pump body having a pumping chamber provided by an annular arrangement of one or more pumping plunger bores with axes extending generally radially outwardly from the axis of the distributor rotor, a pumping plunger mounted in each plunger bore for reciprocation and annular cam means surrounding the annular arrangement of pumping plunger bores to provide periodic intake and pumping strokes of the plungers for supplying intake charges of fuel to the pumping chamber and delivering high pressure charges of fuel from the pumping chamber for fuel injection, the distributor rotor being rotatably mounted in a distributor head for distributing the high pressure charges of fuel to a plurality of distributor outlets in the distributor head, (such fuel injection pumps being referred to herein as "Rotary Distributor Type Fuel Injection Pumps").

In such Rotary Distributor Type Fuel Injection Pumps, because the fuel charges are delivered at high pressure, the relatively rotating surfaces of the distributor head and distributor rotor are required to have a very precise rotational fit (for example, having a diametral clearance of 80-100 millionths of an inch) to ensure adequate sealing and lubrication. The precise rotational fit presents certain operating problems as follows:

(a) during pump operation, particularly at high speed, a substantial amount of heat is generated by the high pressure fuel charges and by the thin layer of fuel lubricant between the relatively rotating surfaces of the distributor rotor and distributor head;

(b) adequate lubrication of the relatively rotating surfaces is difficult to achieve at high speed and high temperature, particularly with low viscosity fuels such as gasoline and methanol; and (c) the distributor rotor and distributor head must be maintained at approximately the same temperature throughout the full range of operation of the pump and particularly during cold starting and rapid acceleration; otherwise, the resulting unequal thermal expansion of the parts will cause inadequate lubrication and rotor seizure.

A principal aim of the present invention is to provide a new and improved Rotary Distributor Type Fuel Injection Pump which alleviates the above described operating problems presented by the precise rotational fit between the distributor head and distributor rotor.

Another aim of the present invention is to provide a new and improved Rotary Distributor Type Fuel Injection Pump which minimizes or eliminates cavitation within the high pressure chamber of the pump. In accordance with this aim of the present invention, the fuel injection pump employs a new and improved fuel intake system having a relatively large inlet opening and a relatively short inlet passage between the inlet opening and pumping chamber.

Another aim of the present invention is to provide a new and improved Rotary Distributor Type Fuel Injection Pump having a pump body, distributor rotor and electromagnetic control valve which cooperate to provide one or more of the following advantages:

(a) high pressure chamber with small dead volume;
(b) improved valve responsiveness;
(c) low valve wear and long useful valve life;
(d) high electromagnetic actuating force;
(e) precise valve control of the size and timing of the injected fuel charge;
(f) electromagnetic valve operation with a fixed predetermined air gap.

A further aim of the present invention is to provide a new and improved Rotary Distributor Type Fuel Injection Pump having a valve member coaxially mounted within the pump body and distributor rotor to provide one or more of the following advantages:

(a) delivery of fuel at a relatively high rate to the pumping chamber during the intake strokes of the pumping plungers;
(b) use of fuel to maintain distributor head and distributor rotor relatively cool and at a relatively constant temperature throughout the full range of operation of the pump;
(c) provision of distributor rotor with a relatively small diameter and coaxial valve member with a relatively large diameter; and
(d) delivery of fuel to the pumping chamber at a relatively low velocity to reduce fuel inertia and minimize cavitation within the high pressure chamber.

A further aim of the present invention is to provide in a Rotary Distributor Type Fuel Injection Pump, a new and improved fuel supply system to (a) deliver fuel under pressure to the pumping chamber during the intake strokes; (b) receive fuel spilled from the pumping chamber during the pumping strokes without excessive back pressure; and (c) maintain temperature of distributor rotor and distributor head relatively cool and at a generally constant temperature throughout the full range of operation of the pump.

In accordance with another aim of the present invention, a new and improved Rotary Distributor Type Fuel Injection Pump is provided which (a) can deliver charges of fuel from the high pressure chamber at 12,000 psi and higher; (b) can be used with high speed engines; and (c) can be electrically controlled to precisely regulate the size and timing of the injected fuel charge.

Other objects will be in part obvious and in part pointed out more in detail hereinafter.

A better understanding of the invention will be obtained from the following detailed description and accompanying drawings of an illustrative application of the invention.

DESCRIPTION OF PREFERRED EMBODIMENT

Figure 1:
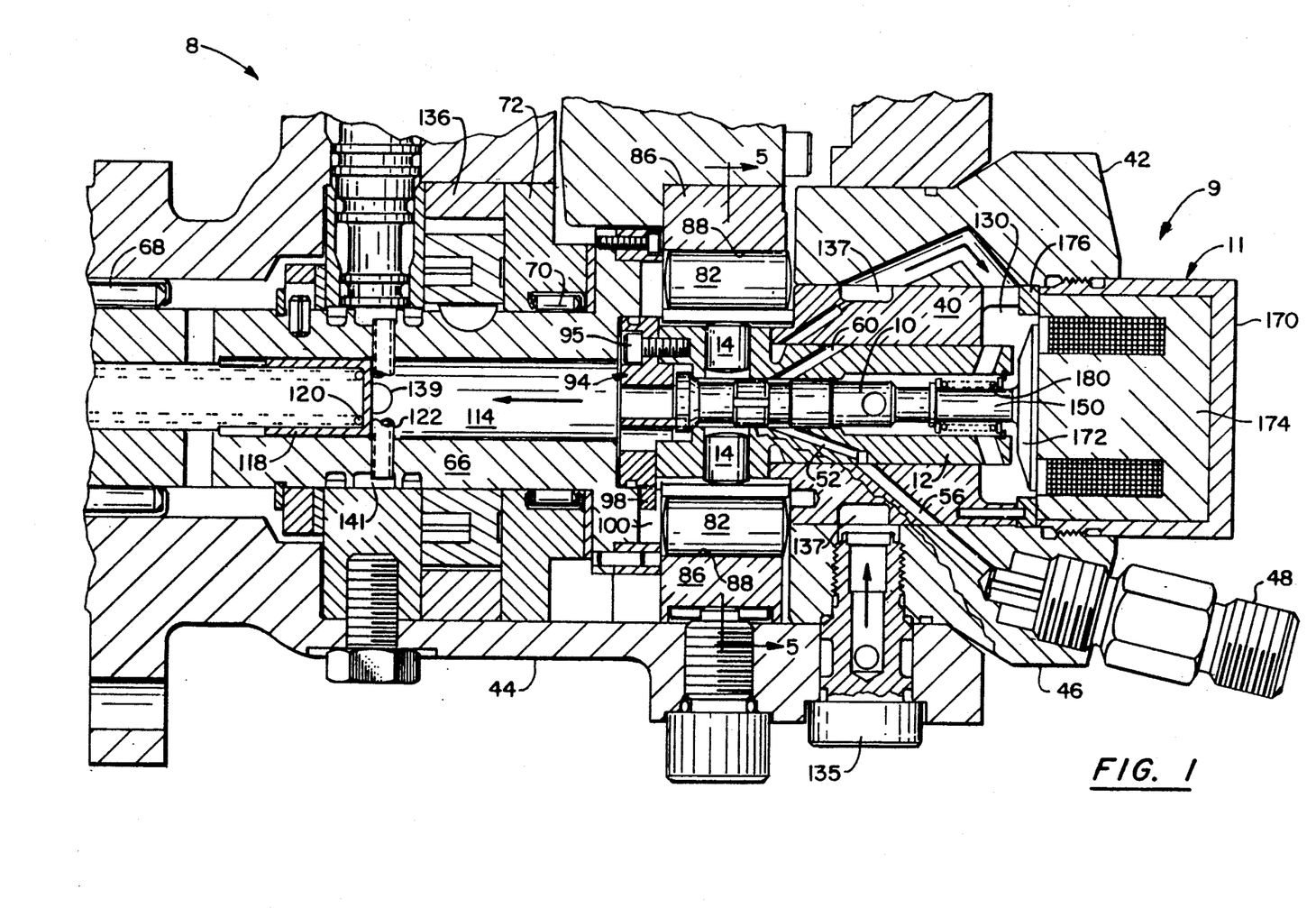
FIG. 1 is a longitudinal section view, partly broken away and partly in section, of a fuel injection pump incorporating an embodiment of the present invention, showing a poppet valve of the pump in its closed position.
Figure 2:
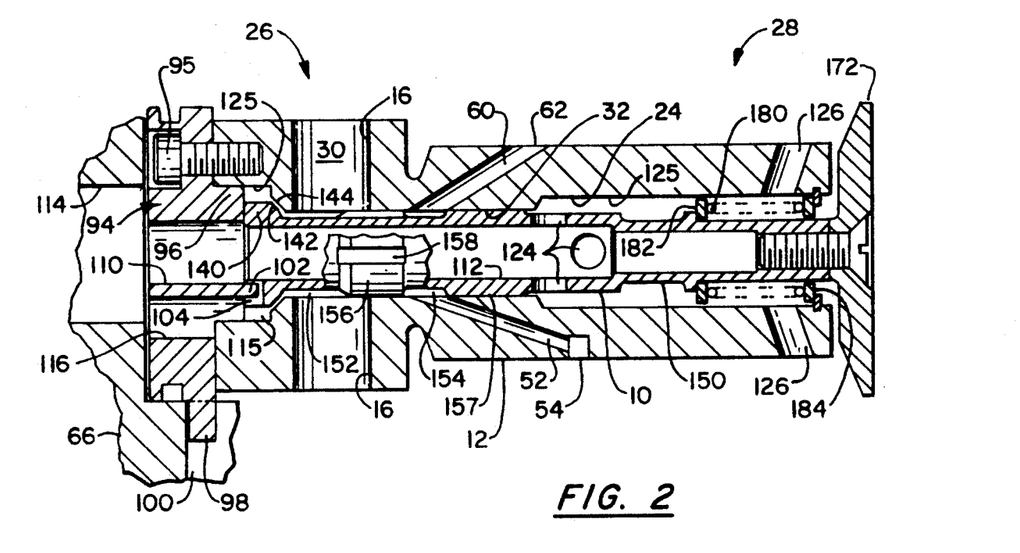
FIG. 2 is an enlarged, longitudinal section view, partly broken away and partly in section, of a rotor subassembly of the fuel injection pump, showing the poppet valve in its open position.
Figure 3:
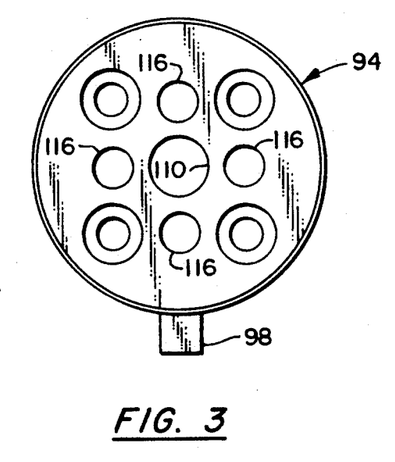
FIGS. 3 and 4 are enlarged end views of a coupling member of the fuel injection pump.
Figure 4:
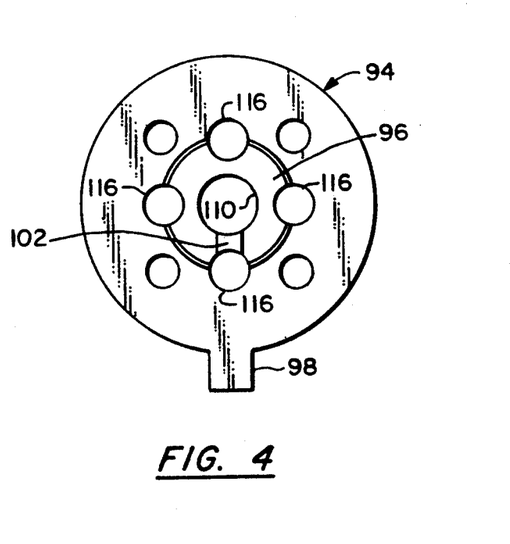
Figure 5:
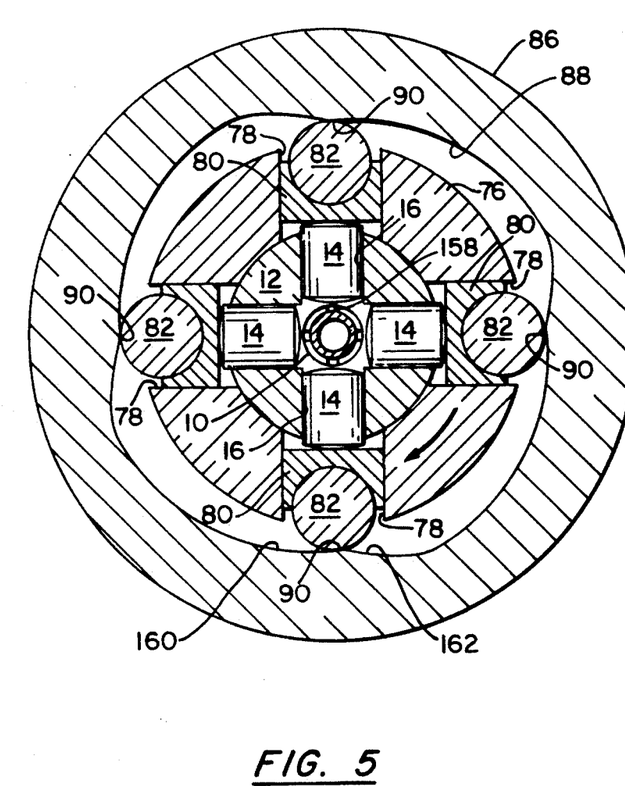
FIG. 5 is an enlarged, partial transverse section view, partly in section, of the fuel injection pump, taken generally along line 5—5 of FIG. 1.
Figure 6:
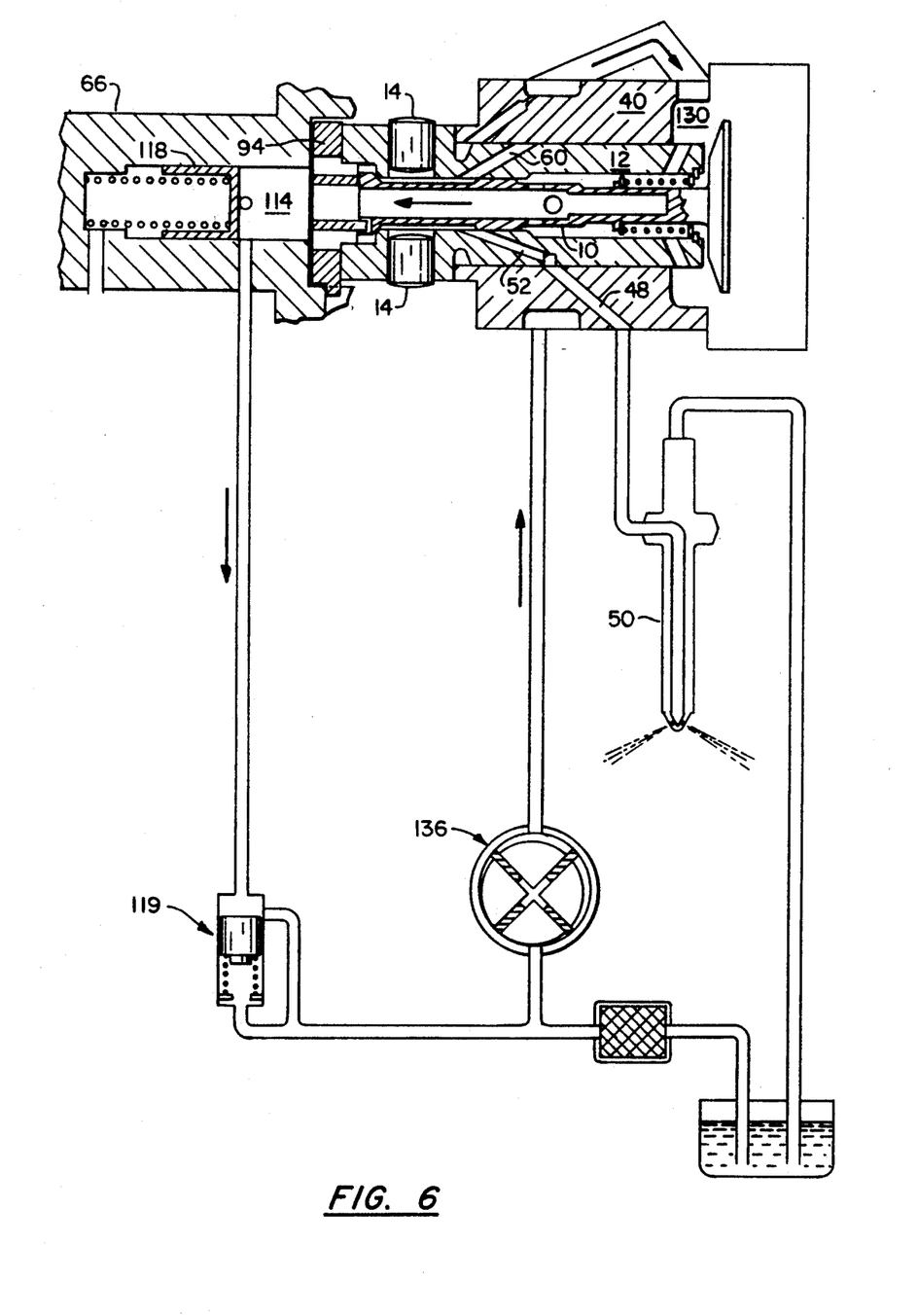
FIG. 6 is a generally diagrammatic view of the fuel supply system of the fuel injection pump.

In the drawings, the same numerals are used to identify the same or like functioning parts or components. FIGS. 1–6 show an exemplary fuel injection pump 8 incorporating an embodiment of the present invention. The pump 8 has an electrical control valve 9 for regulating the size and timing of each injected charge. The control valve 9 is a bidirectional flow valve having an axially shiftable poppet valve member 10 and an electromagnet 11 for shifting the poppet valve 10 to its closed position. The control valve 9 may be employed to provide a pump-spill or spill-pump-spill mode of operation. However, the pump 8, as hereafter described, provides a fill-spill mode of operation of the type described in U.S. Pat. No. 4,757,795, dated Jul. 19, 1988 and entitled "Method And Apparatus For Regulating Fuel Injection Timing And Quantity". Thus, U.S. Pat. No. 4,757,795, which is incorporated herein by reference, should be referred to for any details of the fill-spill mode of operation not disclosed herein.

The exemplary pump 8 is designed for use with a four cylinder engine. The pump 8 has an elongated pump rotor 12 which is constructed in the form of a single thick sleeve having a stepped, generally cylindrical, outer surface and a stepped coaxial throughbore 24. The pump rotor 12 provides a pump body 26 at its inner end and an elongated distributor rotor 28 at its outer end. The pump body 26 has a pumping chamber 30 provided by an annular arrangement of four equiangularly spaced radial bores 16. A pumping plunger 14 is mounted in each bore 16. Each plunger bore 16 extends radially inwardly from the outer surface of the pump body 26 to the rotor throughbore 24. The rotor throughbore 24 provides a coaxial valve bore 32 within the pump body 26 and distributor rotor 28 for the poppet valve 10.

The distributor rotor 28 is rotatably mounted within an inner support sleeve 40 of a fixed distributor head 42 which forms part of the pump housing 44. The distributor rotor 28 has a very precise rotational fit (e.g., having a diametral clearance of 80–100 millionths of an inch) within the sleeve 40 to ensure adequate sealing and lubrication. An outer hydraulic head 46 of the distributor head 42 has four equiangularly spaced distributor outlets 48, one for each fuel injector 50 of an associated internal combustion engine (not shown).

The distributor rotor 28 provides for distributing high pressure charges of fuel to the four distributor outlets 48. The distributor rotor 28 has a short, inclined distributor bore 52 leading to a peripheral distributor port 54. The distributor port 54 rotates into registry with equiangularly spaced outlet ports 56 in the distributor head sleeve 40 to deliver high pressure charges of fuel to the distributor outlets 48 in sequence. A short, inclined balancing bore 60 is also provided in the distributor rotor 28. The balancing bore 60 provides a peripheral balancing port 62 spaced 180° from the distributor port 54 to balance the lateral hydraulic forces on the rotor 28. The balancing port 62 is axially spaced from the distributor port 54 so that it does not rotate into registry with the outlet ports 56. Additional high pressure passages are not provided in the pump rotor 12 for connecting the pumping chamber 30 to the distributor ports 56 or for connecting the pumping chamber 30 to the poppet valve inlet. The volume of the high pressure chamber is thereby held to a minimum. Also, the short inclined distributor bore 52 is provided in place of the usual, relatively long, coaxial delivery bore (not shown) to minimize distributor rotor distortion caused by the periodic high pressure pulses. The thickness and outer diameter of the distributor rotor 28 can and are thereby reduced to reduce the heat generated by the thin lubricant film between the relatively rotating surfaces of the rotary distributor.

A pump drive shaft 66 is driven by the associated engine at one-half engine speed in the case of a four stroke engine and at engine speed in the case of a two stroke engine. The drive shaft 66 is mounted in coaxial alignment with the pump rotor 12 by a main or outer roller bearing 68 supported by the pump housing 44 and an inner roller bearing 70 supported by a transverse plate 72 forming part of the pump housing 44.

The drive shaft 66 has an enlarged, generally annular, inner end providing a roller shoe support cage 76. The cage 76 has four equiangularly spaced radial slots 78 aligned with the four pumping plungers 14. A roller shoe 80 is slidably mounted in each slot 78 for engagement with the corresponding plunger 14. A plunger actuating roller 82 is supported by each shoe 80 for engagement with an internal cam 88 of a cam ring 86 surrounding the cage 76. The cam 88 has four equiangularly spaced cam lobes 90 engageable by the plunger actuating rollers 82 for periodically camming the plungers 14 inwardly together during rotation of the pump rotor 12. If desired, a suitable mechanism (not shown) may be provided for adjusting the angular position of the cam ring 86 to adjust the plunger stroke timing. Otherwise, the cam ring 86 provides fixed plunger stroke timing.

The rollers 82, shoes 80 and internal cam 88 have an axial width substantially greater than the total axial width of the bank of four plungers 14. The plunger actuating forces are thereby transmitted along a greater axial length to reduce the roller pressure on the cam 88. The plunger diameter and stroke are selected to optimize the roller pressure and plunger stroke for the largest volume charge to be injected by the pump.

The pump rotor 12 is directly driven by the shaft 66 via a drive coupling member 94 coaxially mounted between opposed adjacent ends of the drive shaft 66 and pump rotor 12. The coupling member 94 is secured against the inner axial end face of the pump rotor 12 by four equiangularly spaced fasteners 95. A front coaxial hub 96 of the coupling member 94 is snugly received within the inner end of the rotor throughbore 24. The coupling member 94 has a peripheral, radially extending tang 98 received within a radial slot 100 in the drive shaft 66 to key the coupling member 94 to the drive shaft 66. The pump rotor 12 is thereby positively coupled to the drive shaft 66 for rotation by the drive shaft 66. The coupling member 94 is also keyed to the poppet valve 10 by a central, axially extending tang 102 received within a radial slot 04 in the poppet valve 10. The poppet valve 10 is thereby positively coupled for rotation with the pump rotor 12. The coupling member 94 is circular and symmetrical except for the two described integral tangs 98, 102.

The coupling member 94 has a central coaxial bore 110 interconnecting a coaxial fuel supply bore 112 in the poppet valve 10 and a coaxial accumulator bore 114 in the drive shaft 66. Four, radially offset, axial bores 116 in the coupling member 94 interconnect the accumulator bore 114 and an annular fuel chamber 115 at the inner end of the rotor throughbore 24. A spring-biased accumulator piston 118 is mounted within the accumulator bore 114. A long compression spring 120 biases the accumulator piston 118 inwardly toward the poppet valve 10 and into engagement with a roll pin 122 mounted within a transverse bore in the drive shaft 66. The accumulator bore 114 serves to accumulate fuel at a pressure regulated by a pressure regulator 119 (FIG. 6) connected to the accumulator bore 114. In a conventional manner, the regulator 119 provides a regulated pressure which increases with pump speed. The accumulator chamber 114 and inner annular chamber 115 together provide a supply chamber of fuel at the regulated pressure for supplying fuel to the pumping chamber 30 and receiving fuel spilled from the pumping chamber 30.

The poppet valve 10 is formed as a sleeve to reduce its mass (and thereby increase its responsiveness) and to provide a coaxial fuel supply bore 112 in the poppet valve 10. Two, axially spaced, diametral bores 124 in the poppet valve 10 connect the internal bore 112 to an enlarged outer end section 125 of the rotor throughbore 24 within the distributor rotor 28. Radial bores 126 are provided in the outer end of the distributor rotor 28 to connect the enlarged throughbore section 125 to an upstream end chamber 130 surrounding the outer end of the distributor rotor 28. Thus, the upstream end chamber 130 is connected to the accumulator chamber 114 at the opposite end of the rotor 12 via radial and axial bores in the distributor rotor 28 and via radial and axial bores in the poppet valve 10.

A transfer or supply pump 136 is mounted on the drive shaft 66 for supplying fuel under pressure. The supply pump 136 is a positive displacement, vane type pump. Fuel is supplied under pressure from the supply pump outlet via a connector plug 135 to a peripheral annulus 137 in the distributor head sleeve 40 and from the annulus 137 to the upstream end chamber 130 via a drilled L-shaped passage in the hydraulic head 46. Fuel is supplied from the end chamber 130 via the described internal passages in the distributor rotor 28 and poppet valve 10 to the accumulator chamber 114. Excess fuel supplied to the accumulator chamber 114 is returned to the transfer pump inlet via two radial ports 139 and peripheral annulus 141 in the drive shaft 66 and the pressure regulator 119. Relatively cool inlet fuel is thereby supplied continuously through the distributor head 42, distributor rotor 28 and poppet valve 10 to maintain those parts relatively cool and at a relatively constant temperature. The usual problems caused by unequal thermal expansion of the distributor rotor 28 and distributor head 42 are thereby greatly reduced or eliminated.

The poppet valve 10 has an enlarged sealing head 140 at its inner end with a frustoconical face 142 engageable with an annular, frustoconical valve seat 144 formed by the pump body 12. The valve seat 144 diverges outwardly slightly from the valve face 142 (e.g., at an angle of 5°) so that the valve face 142 has line engagement with the inner circular edge of the valve seat 144. The poppet valve 10 is axially shiftable (e.g., approximately 0.005 inch) between its closed position in engagement with the valve seat 144 and its fully open position in engagement with the coupling member 94.

The poppet valve stem 150 has two axially spaced peripheral annuli 152, 154 and an intermediate valve support land 156 with four peripheral axial slots 158. The annuli and slots together form a peripheral passage that extends inwardly from the valve face 142 to the inner end ports of the distributor and balancing bores 52, 60. The peripheral annulus 152 connects the pumping chamber 30 to the annular valve opening between the opposed valve face 42 and valve seat 144 when the poppet valve 10 is open. A second intermediate valve support land 157 has sealing engagement with the distributor rotor 28 to seal the high pressure chamber from the outer end of the rotor throughbore 24. Thus, the high pressure chamber is formed by the inner ends of the plunger bores 16, annuli 152, 154, axial slots 158, distributor and balancing bores 52, 60 and distributor port 54. The annulus 152 extends inwardly from the poppet valve head 140 to minimize required poppet valve movement to open the poppet valve 10.

During each intake stroke, while the poppet valve 10 is open, fuel is delivered from the accumulator bore 114 via the annular fuel chamber 115, valve opening and valve annulus 152 to the pumping chamber 30. During each pumping stroke, after the poppet valve 10 is re-opened, fuel is spilled from the pumping chamber 30 into the annular fuel chamber 115 and accumulator bore 114.

The poppet valve 10 is opened at the beginning of each intake stroke of the pumping plungers 14. During the first part of the intake stroke, fuel is supplied under pressure to the pumping chamber 30 to force the plungers 14 outwardly at a rate determined by the slope of the intake ramps 160 of the cam lobes 90. The poppet valve 10 is timely closed, normally before the end of the intake phase, by energizing the valve electromagnet 11. The outward intake stroke of the plungers 14 is terminated when the poppet valve 10 is closed. The amount of fuel delivered to the pumping chamber 30 before the poppet valve 10 is closed is determined by the cam profile. The fuel pressure (e.g., 10 psi) in the housing cavity opposes the outward movement of the plungers 14 to help prevent plunger overtravel after the poppet valve 10 is closed.

The poppet valve 10 remains closed until after the initial part of the following pumping phase of the cam 88 provided by the pumping ramps 162 of the cam lobes 90. During that initial phase, any play between the cam 88 and plungers 14 is first eliminated and then the plungers 14 are actuated inwardly together to deliver a charge of fuel from the pumping chamber 30 at high pressure for fuel injection. It is expected that a fuel charge can be delivered at 12,000 psi and higher.

The electromagnet 11 is normally deenergized before the end of each pumping stroke to open the poppet valve 10 and spill fuel from the pumping chamber 30 and thereby terminate the fuel injection event. The electrical operation of the electromagnet 11 is regulated by a suitable electrical control unit (not shown) to precisely regulate both the fuel injection timing and size of the injected charge. A high resolution angle sensor (not shown) is provided for measuring the rotation of the pump rotor 12 for use in regulating the operation of the electromagnet 11 as described in U.S. Pat. No. 4,757,795 and in U.S. Pat. No. 5,103,792 entitled "Processor Based Fuel Injection Control System" and assigned to the assignee of this application.

The plungers 14 are dimensioned to avoid engagement with the poppet valve 10 at their inner limit positions and yet to minimize the remaining dead volume of the pumping chamber 30. Also, the diameter of the valve bore 32 for the poppet valve 10 is made relatively large (e.g., 0.350 inch) to increase the cross-sectional area of the valve opening and valve annulus 152 and thereby reduce the intake fuel velocity and inertia. Also, a short inlet fuel passage between the valve opening and pumping chamber 30 is provided by the valve annulus 152 to reduce the length and mass of the intake fuel column. It has been found that the resultant reduction in the velocity and inertia of the intake fuel practically eliminates fuel cavitation. Cavitation erosion at the valve seat is thereby eliminated so that the pump can be operated at a higher speed without the adverse effects of cavitation.

A stator 170 of the electromagnet 11 is mounted on the distributor head 42 coaxially aligned with the poppet valve 10. A circular armature plate or disc 172 is fixed onto the outer end of the poppet valve stem 150 by a suitable threaded fastener. The armature 172 is mounted adjacent to the circular pole face of an E-shaped stator core 174 of the stator 170 to be attracted by the stator 170, when energized, to pull the poppet valve 10 to its closed position. An annular shim 176 is provided between the stator 170 and distributor head 42 to establish a predetermined air gap between the armature 172 and stator pole face when the poppet valve 10 is in its fully open position in engagement with the coupling member 94.

A coil compression spring 180 is mounted on the valve stem 150, at the outer end of the poppet valve 10, between a valve stem shoulder 182 and a retaining ring 184 mounted within the outer end of the rotor throughbore 24. The compression spring 180 biases the poppet valve 10 (e.g., with a force of 10 pounds) to rapidly open the poppet valve 10 when the stator 170 is deenergized. The coupling member 94 provides a stop for limiting the opening axial movement (e.g., 0.005 inch) of the poppet valve 10.

As will be apparent to persons skilled in the art, various modifications, adaptations and variations of the foregoing specific disclosure can be made without departing from the teachings of the present invention.

We claim:

1. In a fuel injection pump having a pump body and distributor rotor in coaxial alignment, the pump body having a pumping chamber provided by an annular arrangement of pumping plunger bores with axes extending generally radially outwardly from the axis of the distributor rotor, a pumping plunger mounted in each plunger bore for reciprocation, annular cam means surrounding the annular arrangement of plunger bores for reciprocating the pumping plungers to provide alternating intake and pumping strokes thereof for respectively supplying intake charges of fuel to the pumping chamber and delivering high pressure charges of fuel from the pumping chamber for fuel injection, a distributor head with a plurality of distributor outlets, the distributor rotor being rotatably mounted in the distributor head for distributing the high pressure charges of fuel to the distributor outlets; the improvement wherein the pump body and distributor rotor have a central coaxial bore extending therethrough and providing a valve bore intersecting the annular arrangement of plunger bores, the pump body providing an annular valve seat around the central bore between one end thereof away from the distributor rotor and the intersection of the valve bore and annular arrangement of plunger bores, an elongated valve member mounted in the valve bore having a sealing head at one end thereof engageable with the annular valve seat and extending from the sealing head toward the other end of the central bore, the valve member having an intermediate land in sealing engagement with the distributor rotor to seal the pumping chamber from said other end of the central bore, a fuel supply chamber connected to said one end of the central bore for supplying fuel to the pumping chamber, the valve member being axially shiftable in the valve bore between a closed position thereof with its sealing head in engagement with the valve seat and an open position thereof providing an annular valve opening between the valve seat and sealing head interconnecting said fuel supply chamber and the pumping chamber, valve actuating means comprising an electromagnet at the other end of the valve member from the sealing head and operable when energized to shift the valve member in one axial direction thereof to one of its said positions, and means for shifting the valve member in the opposite axial direction thereof to its other position when the electromagnet is deenergized.

2. A fuel injection pump according to claim 1 further comprising a fuel supply pump, an upstream fuel chamber connected to said other end of the central bore and to receive fuel under pressure from the supply pump, and an internal fuel passage, provided in part by the central bore, connecting said upstream chamber to said fuel supply chamber.

3. A fuel injection pump according to claim 2 wherein said internal fuel passage is provided in part by a section of said central bore within the distributor rotor, a coaxial bore in the valve member having an axial opening at said one end of the valve member in continuous communication with said fuel supply chamber and a passage in the valve member interconnecting said bore section and said valve member bore.

4. A fuel injection pump according to claim 2 further comprising a pressure regulator connected to said fuel supply chamber for regulating the pressure in said fuel supply chamber and returning excess fuel to the fuel supply pump.

5. A fuel injection pump according to claim 1 wherein the electromagnet comprises an armature fixed to said other end of the valve member and a stator operable when the electromagnet is energized to attract the armature in said one axial direction to pull the valve member to its said one position.

6. A fuel injection pump according to claim 5 wherein the pump body and distributor rotor are provided by a pump rotor, wherein the stator is fixed against rotation and wherein the fuel injection pump further comprises means for coupling the valve member to the pump rotor for positive rotation of the valve member and armature therewith.

7. A fuel injection pump according to claim 5 wherein the armature is an armature plate extending transversely to the axis of the pump rotor and wherein the stator has a pole face axially spaced from the armature plate with a predetermined air gap therebetween with the valve member is in its said other position.

8. A fuel injection pump according to claim 1 wherein the valve member is a poppet valve shiftable in an axial direction toward said other end of the central bore to its closed position, the poppet valve forming a peripheral passage for interconnecting, in the open position of the valve member, said one end of the central bore and the pumping chamber.

9. A fuel injection pump according to claim 1 further comprising a drive shaft in coaxial alignment with the pump body and distributor rotor away from the distributor rotor, said fuel supply chamber being provided at least in part by a coaxial accumulator bore in the drive shaft, and a biased accumulator piston reciprocable within the accumulator bore for accumulating fuel under pressure in the accumulator bore.

10. A fuel injection pump according to claim 9 further comprising a pressure regulator connected to the accumulator bore for regulating the pressure therein and for conducting excess fuel therefrom.

11. A fuel injection pump according to claim 10 wherein the valve member has a coaxial bore with an end opening at said one end of the valve member in continuous communication with said accumulator bore and wherein the valve member bore is connected to supply fuel through said end opening to the accumulator bore.

12. A fuel injection pump according to claim 1 wherein the pump body and distributor rotor are provided by a pump rotor and wherein the fuel injection pump further comprises a drive shaft in coaxial alignment with the pump rotor away from the distributor rotor, the pump rotor and drive shaft having adjacent end portions, a coupling member mounted between said adjacent end portions and fixed to one of said end portions, the coupling member and the other of said end portions having cooperating means for coupling the coupling member to said other end portion for rotating the pump rotor with the drive shaft via the coupling member.

13. A fuel injection pump according to claim 12 wherein the coupling member is fixed to said adjacent end portion of the pump rotor and wherein the coupling member and valve member have cooperating means for coupling the valve member to the coupling member for positive rotation of the valve member with the pump rotor.

14. A fuel injection pump according to claim 8 wherein the pump body and distributor rotor are provided by a pump rotor and wherein the fuel injection pump further comprises a coupling member fixed to the pump rotor at said one end of the central bore, the coupling member forming a stop engageable by the poppet valve for establishing the open position of the poppet valve, the coupling member and poppet valve having cooperating means for coupling the poppet valve to the coupling member for positive rotation of the poppet valve with the pump rotor.

15. In a fuel injection pump having a pump rotor with a pumping chamber at one end thereof and a distributor rotor at the other end thereof, the pumping chamber being provided by an annular arrangement of pumping plunger bores with axes extending generally radially outwardly from the axis of rotation of the pump rotor, a pumping plunger mounted in each pumping plunger bore for reciprocation, annular cam means surrounding the annular arrangement of pumping plunger bores for reciprocating the pumping plungers to provide alternating intake and pumping strokes thereof for respectively supplying intake charges of fuel to the pumping chamber and delivering high pressure charges of fuel from the pumping chamber for fuel injection, a distributor head having a plurality of distributor outlets, the distributor rotor being rotatably mounted within the distributor head for delivering the high pressure charges of fuel to the distributor outlets; the improvement wherein the pump rotor has a central coaxial throughbore providing a valve bore intersecting the annular arrangement of plunger bores, an annular, coaxial valve seat around the rotor throughbore between one end thereof away from the distributor rotor and the intersection of the valve bore and annular arrangement of plunger bores, a valve member having a sealing head at one end thereof engageable with the annular valve seat and extending axially from the sealing head toward the other end of the rotor throughbore, the valve member having an intermediate land in sealing engagement with the pump rotor to seal the pumping chamber from said other end of the rotor throughbore, a fuel supply chamber with a regulated fuel pressure connected to said one end of the rotor throughbore, the valve member being axially shiftable in the valve bore between a closed position thereof with its sealing head in engagement with the valve seat and an open position thereof with its sealing head spaced from the valve seat to form an annular valve opening therebetween interconnecting said fuel supply chamber and the pumping chamber, valve actuating means at the other end of the valve member from the sealing head for selectively shifting the valve member between its open and closed positions.

16. A fuel injection pump according to claim 15 wherein the valve member is a poppet valve having a peripheral passage interconnecting, in the open position of the poppet valve, said fuel supply chamber and the pumping chamber, said peripheral passage continuously communicating with the intersection of the valve bore and annular arrangement of pumping plunger bores as the valve member is axially shifted between its open and closed positions.

17. A fuel injection pump according to claim 16 wherein the distributor rotor has a peripheral distributor port for distributing the high pressure charges of fuel to the distributor outlets and an inclined distributor bore connecting the distributor port to said peripheral passage.

18. A fuel injection pump according to claim 15 wherein the valve actuating means comprises an electromagnet in axial alignment with the valve member and operable when energized to pull the valve member in one axial direction thereof to one of its said positions and spring means operable for axially shifting the valve member in its opposite axial direction to the other of its said positions when the electromagnet is deenergized.

19. A fuel injection pump according to claim 18 wherein the electromagnet comprises a transverse armature plate fixed to the valve member and a stator with a pole face axially spaced from the armature plate with a predetermined air gap therebetween with the valve member in its said other position and operable when the electromagnet is energized to attract the armature plate to pull the valve member to its said one position.

20. A fuel injection pump according to claim 15 further comprising a fuel supply pump, an upstream end chamber adjacent said other end of the pump rotor connected to receive fuel under pressure from the supply pump, the distributor rotor and valve member together providing an internal fuel passage within the distributor rotor and valve member for conducting fuel from said upstream end chamber to said fuel supply chamber.

21. A fuel injection pump according to claim 20 further comprising a fuel passage within said distributor head connected in series with and between the fuel supply pump and said upstream end chamber.

22. A fuel injection pump according to claim 20 wherein said internal fuel passage is formed in part by a section of the rotor throughbore within the distributor rotor and a coaxial bore in the valve member having an end opening at said one end of the valve member in continuous communication with said fuel supply chamber.

23. A fuel injection pump according to claim 15 further comprising a fuel supply pump, an upstream end chamber adjacent said other end of the pump rotor connected to receive fuel under pressure from the supply pump, and a coaxial bore in the valve member having an end opening at said one end of the valve member in continuous communication with said fuel supply chamber and connected in series with said upstream end chamber.

24. A fuel injection pump according to claim 15 wherein the distributor head and pump rotor have opposed radially extending thrust surfaces for positioning the pump rotor in a predetermined axial position, a peripheral annulus in the pump rotor for supplying fuel to the opposed thrust surfaces and a restricted passage for supplying fuel under pressure to said peripheral annulus to urge the pump rotor in one axial direction to urge the thrust surfaces apart, the regulated pressure in the fuel supply chamber urging the pump rotor in the opposite axial direction to urge the thrust surfaces together to maintain the pump rotor in said predetermined axial position.

25. In a fuel injection pump having a pump rotor with a pumping chamber at one end thereof and a distributor rotor at the other end thereof, the pumping chamber being provided by an annular arrangement of pumping plunger bores with axes extending generally radially outwardly from the axis of rotation of the rotor, a pumping plunger mounted in each pumping plunger bore for reciprocation, annular cam means surrounding the annular arrangement of pumping plunger bores for reciprocating the pumping plungers to provide alternating intake and pumping strokes thereof for respectively supplying intake charges of fuel to the pumping chamber and delivering high pressure charges of fuel from the pumping chamber for fuel injection, a distributor head having a plurality of distributor outlets, the distributor rotor being rotatably mounted within the distributor head for delivering the high pressure charges of fuel to the distributor outlets; the improvement wherein the pump rotor has a central coaxial throughbore providing a valve bore intersecting the annular arrangement of plunger bores, an annular, coaxial valve seat around the rotor throughbore between one end thereof away from the distributor rotor and the intersection of the valve bore and the annular arrangement of plunger bores, a valve member having a sealing head at one end thereof engageable with the annular valve seat and extending axially from the sealing head toward the other end of the rotor throughbore, the valve member having an intermediate land in sealing engagement with the pump rotor to seal the pumping chamber from said other end of the rotor throughbore, a fuel supply chamber connected to said one end of the rotor throughbore, a pressure regulator connected to said fuel supply chamber to regulate the pressure therein, the valve member being axially shiftable in the valve bore between a closed position thereof with its sealing head in engagement with the valve seat and an open position thereof with its sealing head spaced from the valve seat to form an annular valve opening therebetween interconnecting said fuel supply chamber and the pumping chamber, valve actuating means for selectively shifting the valve member between its open and closed positions, the valve member having a coaxial bore with an end opening at said one end thereof in continuous communication with the fuel supply chamber, a fuel supply pump, and a fuel system for conducting fuel from the fuel supply pump to said fuel supply chamber via said coaxial bore in the valve member.

26. A fuel injection pump according to claim 25 wherein said fuel system comprises an upstream end chamber adjacent said other end of the pump rotor, an annulus in the distributor head, and passage means for supplying fuel from said fuel supply pump via said annulus to said upstream end chamber and from said upstream end chamber to said coaxial bore in the valve member.

27. A fuel injection pump according to claim 26 wherein said passage means comprises a section of the rotor throughbore within the distributor motor connected in series with and between said upstream end chamber and said coaxial bore in the valve member.

* * * * *